United States Patent
Li et al.

(10) Patent No.: US 11,434,323 B2
(45) Date of Patent: Sep. 6, 2022

(54) SILANE-TERMINATED POLYURETHANE CROSSLINKING POLYMER FOR HIGH TENSILE STRENGTH ADHESIVE

(71) Applicant: Henkel AG & Co. KGaA, Duesseldorf (DE)

(72) Inventors: Yufang Li, Solon, OH (US); Henry Ashton, Aurora, OH (US); Raul Benitez Martinez, Solon, OH (US)

(73) Assignee: Henkel AG & Co. KGaA, Duesseldorf (DE)

( * ) Notice: Subject to any disclaimer, the term of this patent is extended or adjusted under 35 U.S.C. 154(b) by 34 days.

(21) Appl. No.: 16/906,065

(22) Filed: Jun. 19, 2020

(65) Prior Publication Data

US 2020/0317853 A1 Oct. 8, 2020

Related U.S. Application Data

(63) Continuation of application No. PCT/US2018/066350, filed on Dec. 19, 2018.

(60) Provisional application No. 62/609,428, filed on Dec. 22, 2017.

(51) Int. Cl.

| C08G 18/61 | (2006.01) |
| C08G 18/48 | (2006.01) |
| C08G 18/81 | (2006.01) |
| C09J 175/08 | (2006.01) |
| C08L 71/02 | (2006.01) |
| C08G 18/12 | (2006.01) |
| C08G 18/28 | (2006.01) |
| C08G 65/333 | (2006.01) |
| C09J 175/06 | (2006.01) |
| C08G 65/336 | (2006.01) |
| C08G 18/75 | (2006.01) |
| C08G 18/24 | (2006.01) |

(52) U.S. Cl.
CPC ............ *C08G 18/61* (2013.01); *C08G 18/12* (2013.01); *C08G 18/246* (2013.01); *C08G 18/289* (2013.01); *C08G 18/4825* (2013.01); *C08G 18/4845* (2013.01); *C08G 18/755* (2013.01); *C08G 18/8125* (2013.01); *C08G 65/336* (2013.01); *C08G 65/33355* (2013.01); *C08L 71/02* (2013.01); *C09J 175/06* (2013.01); *C09J 175/08* (2013.01); *C08G 2115/02* (2021.01); *C08G 2170/90* (2013.01)

(58) Field of Classification Search
CPC ................ C08G 18/61; C08G 18/4845; C08G 18/8125; C08G 2115/02; C08G 2170/90; C08G 18/12; C08G 18/246; C08G 18/289; C08G 18/4825; C08G 18/755; C08G 65/336; C08G 65/33355; C09J 175/08; C09J 175/06; C08L 71/02
See application file for complete search history.

(56) References Cited

U.S. PATENT DOCUMENTS

| 6,265,517 B1 | 7/2001 | Stuart |
| 6,602,964 B2 | 8/2003 | Huang et al. |
| 7,365,145 B2 | 4/2008 | Yang et al. |
| 7,605,203 B2 | 10/2009 | Feng et al. |
| 8,293,368 B2 | 10/2012 | Jucker et al. |
| 8,431,675 B2 | 4/2013 | Braun et al. |
| 8,524,840 B2 | 9/2013 | Zhu et al. |
| 8,563,675 B2 | 10/2013 | Zander et al. |
| 8,609,800 B2 | 12/2013 | Boudet et al. |
| 8,642,708 B2 | 2/2014 | Stanjek et al. |
| 8,907,027 B2 | 12/2014 | Stanjek et al. |
| 2006/0036008 A1 | 2/2006 | Langezaal et al. |
| 2017/0096589 A1 | 4/2017 | Hirokami et al. |

FOREIGN PATENT DOCUMENTS

| JP | 2006131802 A | 5/2006 |
| JP | 2013177637 A | 9/2013 |
| RU | 2355724 C1 | 5/2009 |
| RU | 2440395 C2 | 1/2012 |
| WO | 9836007 A1 | 8/1998 |

OTHER PUBLICATIONS

International Search Report for International PCT Patent Application No. PCT/US2018/066350 dated Mar. 13, 2019.

*Primary Examiner* — Rabon A Sergent
(74) *Attorney, Agent, or Firm* — James E. Piotrowski

(57) ABSTRACT

This disclosure relates generally to a moisture curable composition. The composition includes a first, crosslinkable copolymer having a plurality of silyl alkoxy terminal groups and a backbone that is the reaction product of a diisocyanate and a mixture of a low molecular weight polyether polyol and a high molecular weight polyether polyol; a second crosslinkable oligomer having a plurality of silyl alkoxy terminal groups and a backbone that is the reaction product of a diisocyanate and a low molecular weight polyether polyol; and a third crosslinkable oligomer having a plurality of silyl alkoxy terminal groups and a backbone that is the reaction product of a diisocyanate and a high molecular weight polyether polyol.

19 Claims, 1 Drawing Sheet

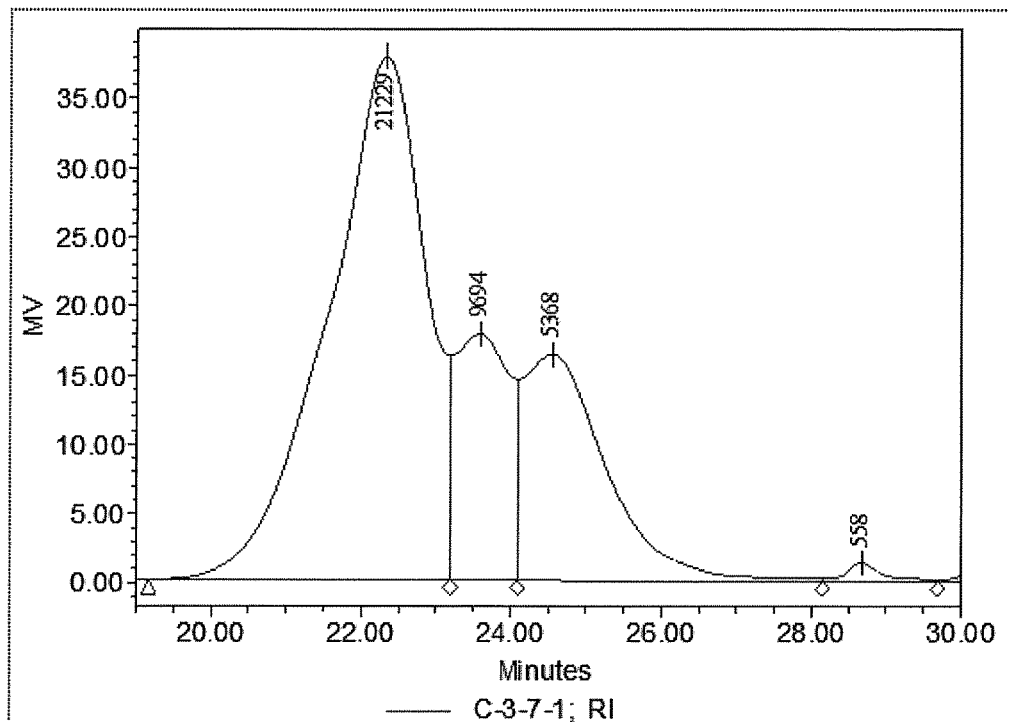
| sample | Retention Time (Minutes) | Mn (Da) | Mw (Da) | MP (Da) | Mz (Da) | Polydispersity (Mw/Mn) | Area % |
|---|---|---|---|---|---|---|---|
| 1 | 22.33 | 22894 | 27069 | 21192 | 33654 | 1.2 | 60.2 |
| 1 | 23.58 | 9282 | 9518 | 9654 | 9755 | 1.0 | 16.0 |
| 1 | 24.54 | 3936 | 4604 | 5390 | 5050 | 1.2 | 22.8 |
| 1 | 28.66 | 522 | 534 | 557 | 546 | 1.0 | 0.9 |
| 2 | 22.34 | 22900 | 27016 | 21229 | 33228 | 1.2 | 60.9 |
| 2 | 23.59 | 9279 | 9513 | 9694 | 9748 | 1.0 | 16.0 |
| 2 | 24.56 | 4008 | 4639 | 5368 | 5067 | 1.2 | 22.3 |
| 2 | 28.68 | 522 | 535 | 558 | 546 | 1.0 | 0.8 |

SILANE-TERMINATED POLYURETHANE CROSSLINKING POLYMER FOR HIGH TENSILE STRENGTH ADHESIVE

TECHNICAL FIELD

This disclosure relates generally to adhesive compositions and more particularly to specific combinations of different silane modified polymers (SMP) for use in curable adhesive compositions.

BACKGROUND OF THE INVENTION

This section provides background information which is not necessarily prior art to the inventive concepts associated with the present disclosure.

The present disclosure relates to the field of curable compositions, as used for example in adhesives, sealants and coating compositions. In particular, the disclosure relates to moisture curable compositions based on silane modified polymers, their use as an adhesive, sealant and/or coating material, and adhesive, sealant and/or coating materials comprising the moisture curable composition.

One-component, moisture-curing adhesives and sealants have for years played an important part in numerous technical applications. As well as the polyurethane adhesives and sealants with free isocyanate groups and the traditional silicone adhesives and sealants based on dimethylpolysiloxanes, there has recently also been increasing use of so-called silane modified adhesives and sealants. These adhesives are distinguished by a broad range of adhesion to a wide variety of substrates without any surface pretreatment such as using primers.

Polymer systems having reactive silyl groups are known in principle. In the presence of atmospheric moisture, polymers having silyl groups with hydrolyzable substituents are capable of condensing with one another at room temperature, splitting off the hydrolyzed residues. Depending on the concentration of silyl groups having hydrolyzable substituents and the structure of these silyl groups, mainly long-chain polymers (thermoplastics), relatively wide-mesh, three-dimensional networks (elastomers) or highly crosslinked systems (thermosets) are formed during this process. The polymers generally comprise an organic backbone which carries, for example, alkoxysilyl or acyloxysilyl groups at the ends. The backbone can be organic, for example, polyurethane, polyester, or polyether or based on polysiloxane. Highly crosslinked systems can have high strength, but the high strength typically requires the cured products to also be very rigid.

Other approaches have been identified to make a silane modified polymer that will provide improved adhesion and bond strength for a final adhesive composition. One frequent drawback is that these approaches result in silane modified polymers having a high viscosity. The high viscosity of a silane modified polymer necessarily leads to a high viscosity in adhesive compositions comprising that silane modified polymer.

Prior compositions suffer from one or more issues of high viscosity, low adhesion, poor low temperature performance or low tensile strength. Thus, there is a need for improved silane modified polymers for use in adhesives. There is a continuing need to make a silane modified polymer having a low viscosity to ease application that will cure to a product having both high strength and also improved flexibility.

SUMMARY OF THE DISCLOSURE

This section provides a general summary of the disclosure and is not a comprehensive disclosure of its full scope or all features, aspects or objectives.

In general terms, this disclosure provides a

These and other features and advantages of this disclosure will become more apparent to those skilled in the art from the detailed description of a preferred embodiment.

BRIEF DESCRIPTION OF THE DRAWINGS

FIG. 1 is a GPC chromatogram of one embodiment of an uncured composition showing the different first silane modified copolymer and second and third silane modified polymers.

DETAILED DESCRIPTION OF A PREFERRED EMBODIMENT

The present disclosure is directed to curable adhesive compositions comprising a plurality of different silane modified polymers. The term "polymer" is to be understood as including polymers and oligomers. The term "curable" is to be understood to mean that, under the influence of external conditions, in particular under the influence of moisture present in the environment and/or supplied for the purpose, the composition can pass from a relatively flexible state, optionally possessing plastic ductility, to an irreversible harder state. The curable adhesive compositions of the present disclosure is surprising in that it provides high adhesion and high tensile strength compared to prior compositions. The curable adhesive compositions of the present disclosure typically comprise a first silane modified copolymer, a second silane modified polymer and a third silane modified polymer.

The first silane modified copolymer has a backbone comprising random distributions of high molecular weight (Mn greater than 10,000 g/mol) polyether blocks, low molecular weight (Mn equal to or less than 2000 g/mol) polyether blocks joined by urethane linkages and terminal silyl alkoxy functional groups linked to the backbone by an aminoalkyl group. The first silane modified copolymer is the product of a reaction of an active silane and the isocyanate functional intermediate product of the high molecular weight polyol, the low molecular weight polyol and a polyisocyanate.

A "polyether polyol" is understood to be a polymer in which the organic repeating units comprise ether functionalities C—O—C in the main chain and which is terminated by a plurality of hydroxyl groups. Polymers having lateral ether groups, such as cellulose ethers, starch ethers and vinyl ether polymers, as well as polyacetals such as polyoxymethylene (POM) are not included in the polyether polyols. As is known to one of skill in the art polyethers are formed from the reaction of an organic oxide with an initiator having at least two active hydrogen groups in the presence of a base catalyst. The polyether polyol is preferably a polyalkylene oxide, particularly preferred are polyether polyols formed from ethylene oxide, propylene oxide, butylene oxide, epichlorohydrin, or mixtures thereof. The polyether polyols to be used in accordance with the disclosure have an OH value of preferably about 120 to about 5 and, more preferably, of about 120 to about 10.

Unless otherwise specified molecular weight is number average molecular weight Mn. The number average molecular weight $M_n$, as well as the weight average molecular weight $M_w$, is generally determined by gel permeation chromatography (GPC, also known as SEC) at 23° C. using a styrene standard. This method is known to one skilled in the art.

The number average molecular weight $M_n$ of the high molecular weight polyether polyol according to the present disclosure can be at least 8000 g/mol and in particular 10,000 to 18,000 g/mol. Particularly advantageous viscoelastic properties can be achieved if polyether polyols having a narrow molecular weight distribution, and thus low polydispersity, are used. These can be produced, for example, by so-called double metal cyanide catalysis (DMC catalysis) during their formation. Polyethers produced in this way are distinguished by a particularly narrow molecular weight distribution, by a high average molecular weight and by a very low number of double bonds at the ends of the polymer chains. Thus it is preferred to utilize DMC catalyzed high molecular weight polyether polyols. Polydispersity is derived from the average molecular weight $M_w$ and number average molecular weight $M_n$ and it is calculated as $PD=M_w/M_n$. The ratio $M_w/M_n$ (polydispersity) indicates the width of the molecular weight distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution, and thus the specific expression of properties associated with molecular weight, such as e.g., viscosity. The maximum polydispersity $M_w/M_n$ of the high molecular weight polyether polyol is less than 1.5, particularly preferably less than 1.2. Some high molecular weight polyether polyols include 10,000 to 18,000. Some exemplary useful high molecular weight polyether polyols include PREMINOL available from AGC Chemicals and ACCLAIM 12200 available from Covestro LLC.

The number average molecular weight $M_n$ of the low molecular weight polyether polyol according to the present disclosure can be less than 4000 g/mol and in particular 1000 to 2000 g/mol. Some exemplary useful low molecular weight polyether polyols include the ARCOL PPG materials available from Covestro LLC such as ARCOL PPG 1000 and ARCOL PPG 2000.

A "polyisocyanate" is understood to be a compound which has at least two isocyanate groups (—NCO) capable of reaction. Useful polyisocyanates include, for example, ethylene diisocyanate; 1,4-tetramethylene diisocyanate; 1,4-tetramethoxybutane diisocyanate; 1,6-hexamethylene diisocyanate (HDI); cyclobutane-1,3-diisocyanate; cyclohexane-1,3- and -1,4-diisocyanate; bis(2-isocyanatoethyl)fumarate; 1-isocyanato-3,3,5-trimethyl-5-isocyanatomethylcyclohexane (isophorone diisocyanate, IPDI); 2,4- and 2,6-hexahydrotoluylene diisocyanate; hexahydro-1,3- or -1,4-phenylene diisocyanate; benzidine diisocyanate; naphthalene-1, 5-diisocyanate; 1,6-diisocyanato-2,2,4-trimethylhexane; 1,6-diisocyanato-2,4,4-trimethylhexane; xylylene diisocyanate (XDI); tetramethylxylylene diisocyanate (TMXDI); 1,3- and 1,4-phenylene diisocyanate; 2,4- or 2,6-toluylene diisocyanate (TDI); 2,4'-diphenylmethane diisocyanate; 2,2'-diphenylmethane diisocyanate, 4,4'-diphenylmethane diisocyanate (MDI) and the isomeric mixtures thereof. Also suitable are partially or completely hydrogenated cycloalkyl derivatives of MDI, for example completely hydrogenated MDI ($H_{12}$-MDI); alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bis-isocyanatoethyl ester, 1 chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate; sulfur-containing diisocyanates such as those obtainable by reacting 2 moles diisocyanate with 1 mole thiodiglycol or dihydroxydihexyl sulfide; diisocyanates of dimer fatty acids, or mixtures of two or more of the named diisocyanates. The polyisocyanate is preferably a diisocyanate and more preferably selected from IPDI, TDI, MDI and combinations thereof.

There is a stoichiometric excess of polyisocyanate NCO groups with respect to the total amount of polyol hydroxyl groups during reaction of the high molecular weight polyol, the low molecular weight polyol and a polyisocyanate to provide the reaction product with isocyanate functionality. The ratio of the number of polyisocyanate NCO groups to the number of polyol OH groups is in the range of 1:1 to 2:1 and preferably 1:1 to 1.6:1.

Isocyanate groups in the intermediate product are reacted with an active silane compound. Suitable active silane compounds are those which can react with isocyanate moieties to form terminal silyl alkoxy groups. Suitable active silane compounds include amino silanes having the general formula:

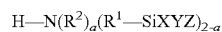

$$H-N(R^2)_a(R^1-SiXYZ)_{2-a}$$

wherein:

a is 0 or 1. $R^2$ is hydrogen or a divalent hydrocarbon residue having 1 to 12 carbon atoms. $R^1$ is a divalent hydrocarbon residue having 1 to 12 carbon atoms and linking the N and Si atom. X, Y, Z are, independently of one another, selected from the group consisting of a hydroxyl group, a $C_1$ to $C_{12}$ alkyl, or a $C_1$ to $C_{12}$ alkoxy group and at least one of X, Y or Z is the alkoxy group. Preferably, two of X, Y or Z are independently chosen alkoxy groups and more preferably all of X, Y or Z are independently chosen alkoxy groups. The amino silane is either a primary or a secondary amine and during the formation of the first silane modified polymer the amino silane loses a hydrogen atom so the amino silane terminal group of the terpolymer comprises —$N(R^2)_a(R^1-SiXYZ)_{2-a}$. The first silane modified polymer will have at least two terminal amino silane groups of the general formula above. Examples of aminosilane compounds include 3-aminopropyltrimethoxysilane, 3-aminopropyltriethoxysilane, N-(2-aminoethyl-3-aminopropyl)trimethoxysilane, 3-aminopropylmethyldiethoxysilane, 4-amino-3,3-dimethylbutyltrimethoxysilane, N-(n-butyl)-3-aminopropyltrimethoxysilane, 1-butanamino-4-(dimethoxymethylsilyl)-2,2-dimethyl, (N-cyclohexylaminomethyl)triethoxysilane, (N-cyclohexylaminomethyl)-methyldiethoxysilane, (N-phenylaminoethyl) trimethoxysilane, (N-phenylaminomethyl)-methyldimethoxysilane or gamma-ureidopropyltrialkoxysilane. Some suitable examples of amino silanes for reaction with the intermediate terpolymer include N-(3-(Trimethoxysilyl)propyl)butylamine (Dynasylan® 1189) or bis(gamma-trimethoxysilylpropyl)amine (Silquest® A1170).

The first silane modified copolymer comprises at least two linking points at which the condensation of the polymers can be completed, splitting off the hydrolyzed residues in the presence of atmospheric moisture. In this way, regular and rapid crosslinkability is achieved so that bonds with good strength can be obtained. In addition, by means of the quantity and the structure of the X, Y and Z hydrolyzable groups—for example by using di- or trialkoxysilyl groups, methoxy groups or longer residues—the configuration of the network that can be controlled to be a long-chain system (thermoplastics) or a relatively wide-mesh three-dimensional network (elastomers) or a highly crosslinked system (thermosets) so that inter alia the elasticity, flexibility and heat resistance of the finished crosslinked compositions can be influenced in this way. In general, di- or trialkoxysilyl end groups have highly reactive linking points which permit rapid curing, high degrees of crosslinking and thus good final strengths. One advantage of dialkoxysilyl groups lies in the fact that, after curing, the corresponding compositions are more elastic, softer and more flexible than systems comprising trialkoxysilyl groups. In addition, they split off little alcohol during curing and are therefore of particular interest when the quantity of alcohol released is to be reduced. With trialkoxysilyl groups, on the other hand, a higher degree of crosslinking can be achieved, which is particularly advantageous if a harder, stronger material is desired after curing. In addition, trialkoxysilyl groups are more reactive and therefore crosslink more rapidly, thus reducing the quantity of catalyst required, and they have lower "cold flow"—the dimensional stability of the cured material under the influence of force and possibly temperature.

The number average molecular weight $M_n$ of the first silane modified copolymer can be about 10,000 g/mol to about 50,000 g/mol and in particular about 15,000 g/mol to about 25,000 g/mol.

The second silane modified polymer has a backbone comprising low molecular weight (Mn equal to or less than 2,000 daltons) polyether blocks and urethane linkages and terminal silyl alkoxy functional groups linked to the backbone by an aminoalkyl group.

The second silane modified polymer is the product of a reaction of an active silane and the isocyanate functional intermediate product of the low molecular weight polyol and a polyisocyanate. Useful polyisocyanates and low molecular weight polyols include those described above. The polyisocyanate is preferably a diisocyanate and more preferably selected from IPDI, TDI, MDI and combinations thereof.

There is a stoichiometric excess of polyisocyanate NCO groups with respect to the polyol hydroxyl groups during reaction of the low molecular weight polyol and the polyisocyanate to provide the second reaction product with isocyanate functionality. The ratio of the number of polyisocyanate NCO groups to the number of polyol OH groups is in the range of 4:1 to 1.2:1 and preferably 2:1 to 1.5:1.

Isocyanate groups in the intermediate product are reacted with an active silane compound. Suitable active silane compounds are those which can react with isocyanate moieties to form terminal silyl alkoxy groups. Suitable active silane compounds include amino silanes having the general formula:

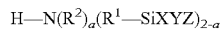

as described above. The second silane modified polymer will have at least two terminal amino silane groups of the general formula above. Examples of some suitable aminosilane compounds include those described above. The second silane modified polymer comprises at least two linking points at which the condensation of the polymers can be completed in the presence of atmospheric moisture. In this way, regular and rapid crosslinkability is achieved so that bonds with good strength can be obtained. In addition, by means of the quantity and the structure of the X, Y and Z hydrolyzable groups the configuration of the cured network that can be controlled.

The number average molecular weight $M_n$ of the second silane modified polymer can be about 8,000 g/mol to about 15,000 g/mol and in particular about 8,000 g/mol to about 11,000 g/mol.

The third silane modified polymer has a backbone comprising low molecular weight ($M_n$ less than 2000 daltons) polyether blocks and urethane linkages and terminal silyl alkoxy functional groups linked to the backbone by an aminoalkyl group.

The third silane modified polymer is the product of a reaction of an active silane and the isocyanate functional intermediate product of the low molecular weight polyol and a polyisocyanate. Useful polyisocyanates and low molecular weight polyols include those described above. The polyisocyanate is preferably a diisocyanate and more preferably selected from IPDI, TDI, MDI and combinations thereof.

There is a stoichiometric excess of polyisocyanate NCO groups with respect to the polyol hydroxyl groups during reaction of the low molecular weight polyol and the polyisocyanate to provide the third reaction product with isocyanate functionality. The ratio of the number of polyisocyanate NCO groups to the number of polyol OH groups is in the range of 4:1 to 1.2:1 and preferably 2:1 to 1.5:1.

Isocyanate groups in the intermediate product are reacted with an active silane compound. Suitable active silane compounds are those which can react with isocyanate moieties to form terminal silyl alkoxy groups. Suitable active silane compounds include amino silanes having the general formula:

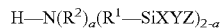

as described above. The third silane modified polymer will have at least two terminal amino silane groups of the general formula above. Examples of some suitable aminosilane compounds include those described above. The third silane modified polymer comprises at least two linking points at which the condensation of the polymers can be completed in the presence of atmospheric moisture. In this way, regular and rapid crosslinkability is achieved so that bonds with good strength can be obtained. In addition, by means of the quantity and the structure of the X, Y and Z hydrolyzable groups the configuration of the cured network that can be controlled.

The number average molecular weight $M_n$ of the third silane modified polymer will be lower than the number average molecular weight $M_n$ of either the first silane modified polymer or the second silane modified polymer. The third silane modified polymer can be about 3,000 g/mol to about 8,000 g/mol and in particular about 4,000 g/mol to about 6,000 g/mol.

Catalysts can optionally be used to modify reaction rate during formation of the first, second and/or third silane modified polymers. Useful catalysts are known in the art and include, by way of example: alkyl tin carboxylates, alkyl tin oxides, alkyl tin mercaptides, dialkyl tin catalysts such as dibutyl tin oxide (DBTO), dibutyltin dilaurate (DBTL) and dioctyltin dilaurate (DOTL); tertiary amine catalysts such as triethylenediamine (TEDA, also called DABCO, 1,4-diazabicyclo[2.2.2]octane), dimethylcyclohexylamine (DM-CHA), dimethylethanolamine (DMEA). It may also include various non-tin organo-metallic catalysts such as Bi, Zr, Zn, Ti or other non-tin organo-metallic catalysts. The level of catalyst in the composition will depend on the type of catalyst used, but can range from about 0.001 wt. % to about 5 wt. %, advantageously from about 0.005 wt. % to about 3 wt. % and more advantageously from about 0.01 wt. % to about 0.5 wt. %, based on the total weight of the adhesive composition.

One general process for forming the isocyanate functional intermediate product is as follows. A mixture comprising the desired polyol(s) is provided and placed under vacuum at an elevated temperature (for example, 170° F.) until the moisture level is less than 300 parts per million. Vacuum is replaced with dry nitrogen and catalyst can optionally be added to the mixture. The mixture is reacted with a polyisocyanate for 30 minutes to 3 hours under nitrogen and at an elevated temperature to form the isocyanate functional intermediate product. The isocyanate functional intermediate product is reacted with an amino silane to form the silane modified polymer(s). Silane modified polymers can be blended and other additives can optionally be added to the mixture to form a curable composition. If used, some useful additives include one or more of crosslinker, filler, moisture scavenger, plasticizer, reactive diluent, rheology modifier, adhesion promoter, catalyst, UV stabilizer, colorant, drying agent, air release agent; fungicide; and flame retardant. The curable composition is preferably essentially free of isocyanate monomers and compounds having isocyanate functionality. As used herein essentially free means the curable composition contains less than 1 wt. %, preferably less than 0.5 wt. %, more preferably less than 0.1 wt. % and may contain 0 wt. % isocyanate monomers and compounds having isocyanate functionality based on the total weight of the curable composition.

The curable composition will typically have the following components and concentrations.

| component | range (wt. %) | preferred range (wt. %) |
|---|---|---|
| first silane modified copolymer | 20-80 | 40-60 |
| second silane modified polymer | 5-40 | 5-20 |
| third silane modified polymer | 10-50 | 15-25 |
| crosslinker | 2-50 | 2-20 |
| filler | 0-80 | 20-60 |
| moisture scavenger | 0-20 | 1-10 |
| plasticizer | 0-60 | 0-40 |
| reactive diluent | 0-60 | 0-30 |
| rheology modifier | 0-30 | 1-10 |
| adhesion promoter | 0-20 | 0.1-5 |
| catalyst | 0-5 | 0.005-1.5 |
| UV stabilizer | 0-2 | 0-2 |
| colorant | 0-30 | 0-20 |

Combination of the different first, second and third silane modified polymers provides surprisingly improved properties to both the uncured composition and cured reaction products of that composition. The first silane modified copolymer provides tacky performance or green strength to the composition and increased flexibility to the cured reaction products. The second silane modified polymer and third silane modified polymer provide higher functionality and lower viscosity to the composition and higher crosslinking density, which contributes to higher tensile strength, for the cured reaction products.

The adhesive composition according to the disclosure can optionally comprise one or more crosslinkers to form a network in the cured composition. One useful class of crosslinkers include polysiloxane resins with a molecular weight of about 1,000 or less. Another useful class of crosslinkers include silanes with a molecular weight of about 1,000 or less, preferably 300 or less, comprising two or more alkoxy groups covalently bonded to the Si atom. One particularly useful class of crosslinkers is siloxane resin with a molecular weight of about 1,000 or less, at least one —Si—O—Si-bond, and silylalkoxy moieties. Preferably, the siloxane resin also includes one or more aromatic ring moieties in the structure. One preferred example is diphenyltetramethoxydisiloxane. The crosslinker can comprise about 0 to 50 wt. %, more preferably 15 to 30% wt. % of adhesive composition.

The adhesive composition according to the disclosure can optionally comprise plasticizer to adjust the elastic properties and to improve the processability of the composition. A plasticizer is understood to be a substance which reduces the viscosity of the composition and thus makes processing easier, and in addition improves flexibility and extensibility of the compositions. The plasticizer may be selected from a fatty acid ester, a dicarboxylic acid ester except cyclohexanedicarboxylic acid dialkyl ester, an ester of epoxidized fatty acids or fatty acids carrying OH groups, a fat, a glycolic acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer, a chlorinated paraffin and mixtures of two or more thereof. By the careful selection of one of plasticizer or of a specific combination of plasticizers, further advantageous properties of the composition according to the disclosure, for example gelling properties of the polymers, low-temperature elasticity or low-temperature resistance or antistatic properties, can be achieved.

Among the polyether plasticizers, preferably end-capped polyethylene glycols are used, for example polyethylene or polypropylene glycol di-$C_{1-4}$-alkyl ethers, in particular the dimethyl or diethyl ethers of diethylene glycol or dipropylene glycol, and mixtures of two or more thereof. Also suitable as plasticizers are, for example, esters of abietic acid, butyric acid ester, acetic acid ester, propionic acid ester, thiobutyric acid ester, citric acid ester and esters based on nitrocellulose and polyvinyl acetate, as well as mixtures of two or more thereof. Also suitable are, for example, the asymmetrical esters of adipic acid monooctyl ester with 2-ethylhexanol (Edenol DOA, Cognis Deutschland GmbH, Düsseldorf). In addition, the pure or mixed ethers of monofunctional, linear or branched $C_{4-16}$ alcohols or mixtures of two or more different ethers of such alcohols are suitable as plasticizers, for example dioctyl ether (available as Cetiol OE, Cognis Deutschland GmbH, Düsseldorf). Likewise, suitable as plasticizers within the framework of the present disclosure are diurethanes, which can be produced e.g. by reaction of diols having OH end groups with monofunctional isocyanates, by selecting the stoichiometry so that substantially all free OH groups react fully. Any excess isocyanate can then be removed from the reaction mixture, e.g. by distillation. Another method for producing diurethanes consists in the reaction of monofunctional alcohols with diisocyanates, wherein as far as possible all NCO groups react fully. If used, the total quantity of plasticizer(s) in curable compositions according to the invention is from 0 wt. % to 30 wt. %, preferably 5 wt. % to 25 wt. % and particularly preferably 10 wt. % to 20 wt. %, based in each case on the total weight of the curable composition.

The adhesive composition according to the disclosure can optionally comprise an adhesion promoter. An adhesion promoter is understood to be a substance which improves the adhesion properties of adhesive layers on surfaces. It is possible to use conventional adhesion promoters known to the person skilled in the art individually or in combination. Examples of suitable adhesion promoters include organosilanes such as amino silanes, epoxy silanes and oligomeric silane compounds. The adhesion promoter, if more reactive than the silane-functional polymer with moisture, can also serve as a moisture scavenger. One or more adhesion promoter(s) is/are preferably contained in the curable composition according to the disclosure in a quantity of 0 to 5 wt. %, more preferably 0.2 to 2 wt. %, in particular 0.3 to 1 wt. %, based in each case on the total weight of the composition.

The adhesive composition according to the disclosure can optionally comprise one or more filler(s). Some useful fillers include chalk, powdered limestone, precipitated and/or pyrogenic silica, zeolites, bentonites, calcium carbonate, magnesium carbonate, kieselguhr, alumina, clay, tallow, titanium oxide, iron oxide, zinc oxide, sand, quartz, flint, mica, powdered glass and other ground minerals. Organic fillers can also be used. Some useful organic fillers include carbon black, graphite, wood fibers, wood flour, sawdust, cellulose, cotton, pulp, wood chips, chopped straw, chaff, ground walnut shells and other short-cut organic fibers. Other short fibers such as glass fibers, glass filament, polyacrylonitrile, carbon fibers, Kevlar fibers or polyethylene fibers can also be useful as filler. Aluminum powder is also suitable as a filler. Hollow spheres with a mineral shell or a plastic shell are suitable as fillers. These can be e.g. hollow glass spheres which are commercially available with the trade names Glass Bubbles®. Plastic-based hollow spheres are commercially available, e.g. with the names Expancel® or Dualite®. These have a diameter of 1 mm or less, preferably of 500 μm or less. In some embodiments the curable compositions are free of carbon black. For some applications, fillers which make the preparations thixotropic are preferred. These fillers are also described as rheological auxiliaries, for example hydrogenated castor oil, fatty acid amides or swellable plastics such as PVC. The filler(s) are preferably used in a quantity of 0 wt. % to 80 wt. %, more preferably 20 wt. % to 60 wt. %, for example 25 wt. % to 55 wt. %, in particular 35 to 50 wt. %, based on the total weight of the composition.

The adhesive composition according to the present disclosure can optionally comprise UV stabilizers. Some useful UV stabilizers are the hindered amine light stabilizers (HALS). A UV stabilizer which carries a silyl group allowing it to be incorporated into the end product during cross-linking or curing can also be used. Furthermore, benzotriazoles, benzophenones, benzoates, cyanoacrylates, acrylates, sterically hindered phenols, phosphorus and/or sulfur can also be useful. The proportion of UV stabilizer(s) in the composition is about 0 wt. % to 2 wt. %, in particular 0 wt. % to 1 wt. %, based on the total weight of the composition.

It can be useful to stabilize the adhesive composition against premature curing caused by moisture penetration in order to increase the shelf life even more. This can be achieved by the use of moisture scavenger or drying agents. The adhesive composition can optionally comprise moisture scavenger or drying agent. Useful drying agents are all compounds that react with water to form a group that is inert towards the reactive groups present in the composition while undergoing only small changes in their molecular weight. Naturally, the reactivity of the drying agents towards moisture that has penetrated into the composition must be higher than the reactivity of the amino silane end groups of the terpolymer in the composition. If used, the proportion of moisture scavenger or drying agent in the composition is about 0.1 wt. % to 10 wt. % and preferably about 1 wt. % to about 2 wt. %, based on the total weight of the composition. Useful moisture scavengers include vinyl silane-trimethoxyvinylsilane (VTMO).

The curable composition can include solvent if necessary to provide known properties. However, the curable composition is preferably essentially free of solvent. As used herein essentially free means the curable composition contains less than 1 wt. %, preferably less than 0.5 wt. %, more preferably less than 0.1 wt. % and may contain 0 wt. % solvent based on the total weight of the curable composition.

The total level of these additives will vary depending on amount of each particular additive needed to provide the adhesive composition with desired properties. The level of additives can be from 0 wt. % to about 90 wt. %, advantageously from about 10 wt. % to about 85 wt. %, based on the total weight of the adhesive composition.

The curable adhesive composition can be prepared by mixing the non-reactive components until homogeneously blended. This is followed by mixing the silane modified polymers to the blended non-reactive components. Mixing should be done at an elevated temperature and in a controlled atmosphere to exclude moisture and prevent cross-linking and curing of the silane modified polymers and/or composition. The curable adhesive compositions in the uncured state will be pasty solids. The curable adhesive compositions are not hot melt adhesives.

The disclosed curable compositions are useful for bonding articles composed of a wide variety of substrates (materials), including but not limited to wood, metal, polymeric plastics, glass, textiles and composites. The adhesive compositions can be used to bond articles together by applying the adhesive composition, typically at room temperature, to a first article substrate; and bringing a second article substrate in contact with the adhesive composition applied to the first article. After application of the second article the adhesive bond can be exposed to conditions suitable to crosslink the composition and cure it to an irreversible solid form. At conditions of 23° C. and 50% humidity for 24 hours the moisture present in the air and on the substrate surface is typically suitable to cure the disclosed composition to an irreversible solid form. As used herein, "irreversible solid form" means a solid form wherein the silane terminated polymers of the composition crosslink to produce a cured, thermoset, insoluble material.

Testing Methods

The following testing methods were utilized to test the polymers and compositions as discussed herein. Viscosity is measured using a Malvern Kinexus rheometer with a gap=0.5 mm. The sample temperature is maintained at 23 C. The viscosity value is reported in centipoise per second (cps).

EXAMPLES

Skin Over Test:

Slowly pour the uncured polymer mixture into an aluminum panel. Slide the polymer mixture with aluminum card to make a film with even surface thickness. When the card slides down to the bottom of the panel, timing starts. Use a finger tip or tongue depressor to touch the film slightly and lift it up slowly until the lifted film is not broken in the middle and no polymer is left on the finger top or tongue depressor. Stop timing and record the skin over time.

Shore a Hardness Test:
Slowly pour the uncured polymer mixture into a 50 mm diameter circle cell with 6 mm depth on a polytetrafluoroethylene (PTFE) substrate. Slide the polymer mixture with card to make a flat surface. Cure the sample. After 7 days, remove the cured polymer from the cell and tested for Shore hardness.

Tensile Strength and Elongation Test:
Pour the uncured polymer mixture into an aluminum mold on a polytetrafluoroethylene (PTFE) substrate. Slide the polymer mixture with card to make a flat surface with a thickness of about 1-1.5 mm. Cure the sample. Peel the cured sample from the mold/PTFE substrate. ASDM D412 was used to measure the tensile strength and elongation using the Tinius Oisen Universal testing machine with 10K model and 5000 N load cell.
Samples were cured by exposure to 23° C. and 50% humidity for 7 days.

Example 1

A composition comprising a mixture of silane modified copolymers and polymers was prepared from the following components. This is Sample 1.

| | |
|---|---|
| Acclaim ® 12200 (Covestro LLC) | 660 gram |
| Acrol ® PPG 2000 (Covestro LLC) | 663 gram |
| Dioctytin dilaurate (DOTL) (Reaxis ® C216) | 0.32 gram |
| Isophorone disisocyarate (IPDI) (Covestro LLC Desmodure I) | 145 gram |
| N-3-trimethoxysilyl-propyl-butylamine (Dynrasylan1189 Evonik) | 135 gram |
| Bis(2,2,6,6,-tetramethyl-4-piperidyl)sebaceate (Tinuvin 770) | 24 gram |
| Vinyltrimethoxysilane (Dynasylan VTMO Evonik) | 31.4 gram |

Sample 1 uses polyols at a ratio of 50% high molecular weight polyether polyol to 50% low molecular weight polyether polyol. The isocyanate to polyol mole ratio was 1.7 to 1.
Sample 1 was prepared as follows. Charge polyols into a flask and heat to 75° C. under stirring. Apply vacuum at 75° C. for 1 hour at 10-20 mbar vacuum. Stop vacuum and apply nitrogen to blanket the mix. Water content is 253 ppm after drying as measure by C30 Coulometric Karl Fischer titrator. Add DOTL catalyst under agitation and nitrogen atmosphere and hold for 10 minutes at 75° C. Slowly charge IPDI into the reactor keeping the temperature below 82° C. After 70 minutes, draw the sample from reactor and measure NCO % and viscosity. Viscosity is 33900 cps at 23° C., gap=0.5 mm using Malvern Kinexus. NCO % is 1.376% measured by Mettler Toledo T50 titrator. Cool the reactor to 60° C. Slowly add Dynasylan1189 keeping the temperature below 85° C. React for about 20 minutes. Viscosity=52370 cps; NCO %=−0.294% meaning there is no isocyanate residual left. Add Tinuvin 770 and Dynasylan VTMO and hold 30 minutes.
The final composition is a mixture of a first silane modified copolymer, a second silane modified polymer and a third silane modified polymer composition having a viscosity of about 38000 cps; an average $M_n$ of 8525; and average $M_w$ of 18952; and a polydispersity $M_w/M_n$ of 2.3. The final composition is stored in a moisture-proof glass vessel to prevent moisture induced crosslinking.

Comparative Example A

A composition comprising a single silane modified polymer based on only high molecular weight polyether polyol was prepared from the following components. This is Comparative Sample A.

| | |
|---|---|
| Acclaim ® 12200 (Covestro LLC) | 1105 grams |
| Dioctyltin dilaurate (DOTL) (Reaxis ® C216) | 0.19 grams |
| Isophorone diisocyanate (IPDI) (Covestro LLC Desmodur I) | 45 grams |
| N-3-trimethoxysilyl-propyl-butylamine (Onichem A301 B Onichem) | 49 grams |
| Vinyltrimethoxysilane (Dynasylan VTMO Evonik) | 23 grams |

Sample A uses a single high molecular weight polyol and no low molecular weight polyol. The isocyanate to polyol mole ratio was 2 to 1.

Sample A was prepared as follows. Charge polyol into a flask and heat to 77° C. under stirring. Apply vacuum at 77° C. for 1 hour at vacuum of 10-30 mbar. Stop vacuum and apply nitrogen to blanket the flask. Water content is 94 ppm after drying as measure by C30 Coulometric Karl Fischer titrator. Add DOTL catalyst under agitation and nitrogen atmosphere and hold for 10 minutes at 77° C. Slowly charge IPDI into the reactor keeping the temperature below 82° C. After 70 minutes, draw a sample from reactor and measure NCO % and viscosity. Viscosity is 59810 cps at 23° C., gap=0.5 mm using Malvern Kinexus. NCO % is 0.668% as measured by a Mettle Toledo T50 titrator. After 100 minutes, draw a sample from reactor and measure NCO % and viscosity. Viscosity is 62100 cps at 23° C., gap=0.5 mm using Malvern Kinexus. NCO % is 0.665% as measured by a Mettle Toledo T50 titrator. Slowly add Onichem A301B and Dynasylan VTMO keeping the temperature below 85° C. React for about 20 minutes. Viscosity is 71000 cps; NCO %=−0.078% showing there is no isocyanate residual left.

The final composition is a single silane modified polymer based on only high molecular weight polyether polyol and having a viscosity of about 71000 cps; a Mn of 23823; a Mw of 33113; and a polydispersity Mw/Mn of 1.4. The final composition is stored in a moisture-proof vessel to prevent moisture induced crosslinking.

Example 2

Multiple one component moisture curable compositions were prepared as shown in the following table.

| Sample | Pre-polymer | Crosslinker1 | Crosslinker2 | Catalyst[1] |
|---|---|---|---|---|
| #2 | Sample 1 - 35 g | C2 - 15 g | C5 - 3 g | 0.17 g |
| #3 | Sample 1 - 35 g | C3 - 15 g | C6 - 3 g | 0.17 g |
| #4 | Sample 1 - 35 g | C4 - 15 g | C6 - 3 g | 0.17 g |
| #B | Sample A - 35 g | C2 - 15 g | C6 - 3 g | 0.16 g |
| #C | Sample A - 35 g | C3 - 15 g | C6 - 3 g | 0.16 g |
| #D | Sample A - 35 g | C4 - 15 g | C6 - 3 g | 0.19 g |

C2 Genoisil XB502 available from Wacker Chemie
C3 Silikophen AC900 available from Evonik
C4 Silres IC368 available from Wacker Chemie
C5 Geniosil GF96 available from Wacker Chemie
C6 Geniosil GF91 available from Wacker Chemie
[1]Dioctyl tin laurate (DOTL)

The components were weighed into a mixer (Flack Tek Inc Speed mixer) and mixed for a few minutes until homogeneous. Samples B, C and D are comparative examples based on a single silane modified polymer A.

The above prepared moisture curable compositions were cured and tested for physical properties. The results are shown in the following table.

| sample | Pre-polymer | Skin over time (minutes) | Hardness Shore A | Maximum strength (Psi) | Elongation @max stress (%) |
|---|---|---|---|---|---|
| 2 | Example 1 | 13 minutes | 70 | 653 | 74% |
| 3 | Example 1 | 16 minutes | 80 | 915 | 74% |
| 4 | Example 1 | 25 minutes | 80 | 1185 | 93% |
| B | Sample A | 22 minutes | 45 | 361 | 150% |
| C | Sample A | 15 minutes | 55 | 431 | 150% |
| D | Sample A | 25 minutes | 60 | 485 | 156% |

Comparative Samples B, C and D have lower hardness and substantially lower strength compared to samples 2, 3 and 4.

Example 3

A composition comprising a mixture of silane modified copolymers and polymers was prepared from the following components. This is Sample 5.

| | |
|---|---|
| Polypropylene ether polyol Acclaim ® 12200 (Covestro LLC) | 720 g |
| Polypropylene ether polyol Arcol ® PPG 2000 (Covestro LLC) | 480 g |
| Dioctyltin dilaurate (DOTL) (Reaxis ® C216) | 0.19 g |
| Isophorone diisocyanate (IPDI) (Covestro LLC Desmodur I | 120 g |
| N-3-triethoxysilyl-propyl-butylamine (Dynrasylan1189 Evonik) | 110 g |
| Vinyltrimethoxysilane (Dynasylan VTMO Evonik) | 29 g |

Sample 5 uses polyols at a ratio pf 60% high molecular weight polyether polyol to 40% low molecular weight polyether polyol. The isocyanate to polyol mole ratio was 2.0 to 1.4.

Sample 5 was prepared as follows. Charge polyols into a flask and heat to 70° C. under stirring. Apply vacuum at 70° C. for 1 hour at vacuum of 10-20 mbar. Stop vacuum and apply nitrogen to blanket the mix. Water content is 198 ppm after drying as measured by C30 Coulometric Karl Fischer titrator. Add DOTL catalyst under agitation and nitrogen atmosphere and hold for 10 minutes at 70° C. Slowly charge IPDI into the reactor keeping the temperature below 82° C. After 70 minutes draw a sample from the reactor and measure NCO % and viscosity. Viscosity is 25300 cps at 23° C., gap=0.5 mm using Malvern Kinexus. NCO % is 1.379% measured by a Mettler Toledo T50 titrator. After 85 minutes, draw a sample from the reactor and measure NCO % and viscosity. Viscosity is 27660 cps at 23° C., NCO % is 1.374%. After 100 minutes, draw sample from the reactor and measure NCO % and viscosity. Viscosity is 29000 cps at 23° C., NCO % is 1.375%. Slowly add Dynasylan1189 keeping the temperature below 85° C. Add VTMO. React for about 20 minutes. Viscosity is 37100 cps; NCO % is −0.108% showing there is no isocyanate residual left.

The final composition is a mixture of a first silane modified copolymer, a second silane modified polymer and a third silane modified polymer composition having a viscosity of about 37000 cps; an average Mn of 10411; and average Mw of 20042; and a polydispersity Mw/Mn of 1.9. The final composition is stored in a moisture-proof vessel to prevent moisture induced crosslinking.

Example 4

Multiple one component moisture curable compositions were prepared as shown in the following table.

| Sample | Pre-polymer | Crosslinker1 | Crosslinker2 | Catalyst[1] |
|---|---|---|---|---|
| #6 | Sample 5 - 35 g | C3 - 15 g | C5 2 g | 0.17 g |
| #7 | Sample 5 - 40 g | C3 - 10 g | C6 2 g | 0.17 g |
| #8 | Sample 5 - 45 g | C3 - 5 g | C6 2 g | 0.17 g |
| #9 | Sample 5 - 35 g | C4 - 15 g | C6 2 g | 0.16 g |
| #10 | Sample 5 - 40 g | C4 - 10 g | C6 2 g | 0.16 g |
| #11 | Sample 5 - 45 g | C4 - 5 g | C6 2 g | 0.19 g |
| #12 | Sample 5 - 35 g | C7 - 15 g | C6 2 g | 0.16 g |
| #13 | Sample 5 - 40 g | C7 - 10 g | C6 2 g | 0.16 g |
| #14 | Sample 5 - 45 g | C7 - 5 g | C6 2 g | 0.16 g |

C3 Silikophen AC900
C4 Silres IC368
C5 Geniosil GF96
C6 Geniosil GF91
C7 Silikophen AC1000 available from Evonik
[1]Dioctyl tin laurate (DOTL)

The components were weighed into a mixer and mixed for a few minutes until homogeneous. The above prepared moisture curable compositions were cured and tested for physical properties. The results are shown in the following table.

| Sample | pre-polymer | Crosslinker | Skin over time (min.) | hardness (Shore A) | maximum Tensile strength (psi) | Elongation at max stress (%) |
|---|---|---|---|---|---|---|
| 6 | Sample 5 | Silikophen Ac900 30% | 24 | 70 | 1090 | 70 |
| 7 | Sample 5 | Silikophen AC900 20% | 21 | 60 | 788 | 99 |
| 8 | Sample 5 | Silikophen AC900 10% | 17 | 55 | 382 | 73.4 |
| 9 | Sample 5 | Silres IC368 30% | 30 | 73 | 1500 | 77 |
| 10 | Sample 5 | Silres IC368 20% | 31 | 65 | 1020 | 86 |
| 11 | Sample 5 | Silres IC368 10% | 30 | 50 | 326 | 87 |
| 12 | Sample 5 | Silikophen AC1000 30% | 22 | 75 | 1410 | <25 |
| 13 | Sample 5 | Silikophen AC1000 20% | 21 | 65 | 1210 | 56 |
| 14 | Sample 5 | Silikophen AC1000 10% | 20 | 63 | 698 | 63 |

Three crosslinkers (Silikophen AC900, Silres IC368 and Silikophen1000) were evaluated from 10% to 30%. In each case increasing the amount of crosslinker led to an increase in tensile strength of the cured product.

Example 5

A composition comprising a mixture of silane modified copolymers and polymers was prepared from the following components. This is Sample 15.

| | |
|---|---|
| Polypropylene ether polyol Acclaim ® 12200 (Covestro LLC) | 840 gram |
| Polypropylene ether polyol Arcol ® PPG 2000 (Covestro LLC) | 360 gram |

-continued

| | |
|---|---|
| Dioctyltin dilaurate (DOTL) (Reaxis ® C216) | 0.19 gram |
| Isophorone diisocyanate (IPDI) (Covestro LLC Desmodur I) | 103 gram |
| N-3-trimethoxysilyl-propyl-butylamine (Dynrasylan1189 Evonik) | 91 gram |
| Vinyltrimethoxysilane (Dynasylan VTMO Evonik) | 33 gram |

Sample 15 uses polyols at a ratio of 70% high molecular weight polyether polyol to 30% low molecular weight polyether polyol. The isocyanate to polyol mole ratio was 1.83 to 1.

Sample 15 was prepared as follows. Charge polyols into a flask and heat to 70° C. while stirring. Apply vacuum at 70° C. for 1 hour at vacuum of 10-20 mbar. Stop vacuum and apply nitrogen to blanket the mix. Water content is 198 ppm after drying as measured by C30 Coulometric Karl Fischer titrator. Add DOTL catalyst under agitation and nitrogen atmosphere and hold for 10 minutes at 70° C. Slowly charge IPDI into the reactor keeping the temperature below 82° C. After 70 minutes, draw a sample from the reactor and measure NCO % and viscosity. Viscosity is 28490 cps at 23° C., gap=0.5 mm using Malvern Kinexus. NCO % is 1.245% measured by a Mettler Toledo T50 titrator. After 90 minutes, draw a sample from the reactor and measure NCO % and viscosity. Viscosity is 31600 cps at 23° C., NCO % is 1.197%. After 100 minutes, draw the sample from the reactor and measure NCO % and viscosity. Viscosity is 31980 cps at 23° C., NCO % is 1.198%. Slowly add Dynasylan1189 keeping the temperature below 85° C. Add VTMO. Hold reaction for 20 minutes. Viscosity is 43100 cps; NCO % is −0.017% showing there is no isocyanate residual left.

The final composition is a mixture of a first silane modified copolymer, a second silane modified polymer and a third silane modified polymer composition having a viscosity of about 43100 cps; an average Mn of 11838; and average Mw of 21647; and a polydispersity Mw/Mn of 1.8. The final composition is stored in a moisture-proof vessel to prevent moisture induced crosslinking.

Example 6

Multiple one component moisture curable compositions were prepared as shown in the following table.

| Sample | Pre-polymer | polyol ratio[1] | Cross-linker1 | Crosslinker2 | Catalyst[2] |
|---|---|---|---|---|---|
| 16 | Sample 1 - 40 g | 50:50 | C7 - 10 g | C5 - 2 g | 0.17 g |
| 17 | Sample 5 - 40 g | 60:40 | C7 - 10 g | C5 - 2 g | 0.17 g |
| 18 | Sample 15 - 40 g | 70:30 | C7 - 10 g | C5 - 2 g | 0.17 g |

C5 Geniosil GF96
C7 Silikophen AC1000
[1] weight ratio of high molecular weight polyol to low molecular weight polyol based on the combined weight of the polyols.
[2] Dioctyl tin laurate (DOTL)

The components were weighed into a mixer and mixed for a few minutes until homogeneous. The above prepared moisture curable compositions were cured and tested for physical properties. The results are shown in the following table.

Test Result:

| Sample | Pre-polymer | polyol ratio[8] | Skin over time (minutes) | Hardness Shore A | Maximum strength (Psi) | Elongation @ max stress (%) |
|---|---|---|---|---|---|---|
| 16 | Sample 1 - 40 g | 50:50 | 18 | 75 | 1104 | 64% |
| 17 | Sample 5 - 40 g | 60:40 | 24 | 75 | 1550 | 18% |
| 18 | Sample 15 - 40 g | 70:30 | 20 | 78 | 1315 | 25% |

[8] weight ratio of high molecular weight polyol to low molecular weight polyol based on the combined weight of the polyols.

All three polymers provide the high tensile strength. Surprisingly, a polyol ratio of 60 wt. % high molecular weight polyol to 40 wt. % low molecular weight polyol provided a higher strength than compositions made using lower or higher polyol ratios. The low elongation for samples 17 and 18 would not be acceptable for many applications however.

Example 7

A composition comprising a mixture of silane modified copolymers and polymers was prepared from the following components. This is Sample 19.

| | |
|---|---|
| Polypropylene ether polyol Acclaim ® 12200 (Covestro LLC) | 840 gram |
| Polypropylene ether polyol Arcol ® PPG 1000 (Covestro LLC) | 360 gram |
| Dioctyltin dilaurate (DOTL) (Reaxis ® C216) | 0.23 gram |
| Isophorone diisocyanate (IPDI) (Covestro LLC Desmodur I) | 162 gram |
| N-3-trimethoxysilyl-propyl-butylamine (Dynrasylan1189 Evonik) | 165 gram |
| Vinyltrimethoxysilane (Dynasylan VTMO Evonik) | 31.4 gram |

Sample 19 uses polyols at a ratio of 70% high molecular weight polyether polyol (ACCCLAIM 12000) to 30% low molecular weight polyether polyol (ARCOL PPG 1000). The isocyanate to polyol mole ratio was 1.7 to 1.

Sample 19 was prepared as follows. Charge polyols into a flask and heat to 70° C. under stirring. Apply vacuum at 70° C. for 1 hour at vacuum of 10-20 mbar. Stop vacuum and apply nitrogen to blanket the mix. Water content is 271 ppm after drying as measured by C30 Coulometric Karl Fischer titrator. Add DOTL catalyst under agitation and a nitrogen atmosphere and hold for 10 minutes at 70° C. Slowly charge IPDI into the reactor keeping the temperature below 82° C. After 60 minutes draw a sample from the reactor and measure NCO % and viscosity. Viscosity is 34340 cps at 23° C., gap=0.5 mm using Malvern Kinexus. NCO % is 1.761% measured by Mettler Toledo T50 titrator. After 75 minutes draw a sample from reactor and measure NCO % and viscosity. Viscosity is 36490 cps at 23° C., NCO % is 1.732%. After 90 minutes, draw the sample from reactor and measure NCO % and viscosity. Viscosity is 36800 cps at 23° C., NCO % is 1.72%. Slowly add Dynasylan1189 keeping temperature below 85° C. Add VTMO. Hold reaction for 20 minutes. Viscosity is 37870 cps; NCO % is −0.421% showing there is no isocyanate residual left.

The final composition is a mixture of a first silane modified copolymer, a second silane modified polymer and a third silane modified polymer composition having a viscosity of about 37400 cps; an average Mn of 7020; and average Mw of 17548; and a polydispersity Mw/Mn of 2.5. The final composition is stored in a moisture-proof vessel to prevent moisture induced crosslinking.

Example 8

Multiple one component moisture curable compositions were prepared as shown in the following table.

| Sample | Prepolymer | Crosslinker1 | Crosslinker2 | Catalyst[1] |
|---|---|---|---|---|
| 20 | Sample 19 - 40 g | C3 - 10 g | C5 - 2 g | 0.17 g |
| 21 | Sample 19 - 35 g | C3 - 15 g | C5 - 2 g | 0.17 g |

C3 Silikophen AC900
C5 Geniosil GF96
[1]Dioctyl tin laurate (DOTL)

The components were weighed into a mixer and mixed for a few minutes until homogeneous. The above prepared moisture curable compositions were cured and tested for physical properties. The results are shown in the following table.

| Sample | Prepolymer | Skin over time (minutes) | Hardness (Shore A) | Maximum strength (Psi) | Elongation @ max stress (%) |
|---|---|---|---|---|---|
| 20 | Sample 19 - 40 g | 18 | 65 | 767 | 76% |
| 21 | Sample 19 - 35 g | 20 | 68 | 1334 | 75% |

Testing Results
The polymer made using Acclaim 12200 and Arcol PPG 1000 also show the very high tensile strength with crosslinker Silikophen AC900 and good flexibility.

Comparative Example 9

A composition comprising a single silane modified polymer based on only high molecular weight polyether polyol was prepared from the following components. This is Sample E.

| | |
|---|---|
| Acclaim ® 12200 (Covestro LLC) | 1105 grams |
| Dioctyltin dilaurate (DOTL) (Reaxis ® C216) | 0.19 grams |
| Isophorone diisocyanate (IPDI) (Covestro LLC Desmodur I) | 45 grams |
| N-3-trimethoxysilyl-propyl-butylamine (Onichem A301 B Onichem) | 49 grams |
| Vinyltrimethoxysilane (Dynasylan VTMO Evonik) | 23 grams |

Sample E uses a single high molecular weight polyol and no low molecular weight polyol. The isocyanate to polyol mole ratio was 2 to 1.

Sample E was prepared as follows. Charge polyol into a flask and heat to 77° C. under stirring. Apply vacuum at 77° C. for 1 hour at vacuum of 10-30 mbar. Stop vacuum and apply nitrogen to blanket the flask. Water content is 94 ppm after drying as measure by C30 Coulometric Karl Fischer titrator. Add DOTL catalyst under agitation and nitrogen atmosphere and hold for 10 minutes at 77° C. Slowly charge IPDI into the reactor keeping the temperature below 82° C. After 70 minutes, draw a sample from reactor and measure NCO % and viscosity. Viscosity is 59810 cps at 23° C., gap=0.5 mm using Malvern Kinexus. NCO % is 0.668% as measured by a Mettle Toledo T50 titrator. After 100 minutes, draw a sample from reactor and measure NCO % and viscosity. Viscosity is 62100 cps at 23° C., gap=0.5 mm using Malvern Kinexus. NCO % is 0.665% as measured by a Mettle Toledo T50 titrator. Slowly add Onichem A301B and Dynasylan VTMO keeping the temperature below 85° C. React for about 20 minutes. Viscosity is 71000 cps; NCO %=−0.078% showing there is no isocyanate residual left.

The final composition is a single silane modified polymer based on only high molecular weight polyether polyol and having a viscosity of about 71000 cps; a Mn of 23823; a Mw of 33113; and a polydispersity Mw/Mn of 1.4. The final composition is stored in a moisture-proof vessel to prevent moisture induced crosslinking.

Comparative Example 10

A composition comprising a single silane modified polymer based on only low molecular weight polyether polyol was prepared from the following components. This is Sample F.

| | |
|---|---|
| Arcol ® PPG 2000 (Covestro LLC) | 800 grams |
| Dioctyltin dilaurate (DOTL) (Reaxis ® C216) | 0.3 grams |
| Isophorone diisocyanate (IPDI) (Covestro LLC Desmodur I) | 141.6 grams |
| N-3-thmethoxysilyl-propyl-butylamine (Dynrasylan1189 Evonik) | 130 grams |
| Vinyltrimethoxysilane (Dynasylan VTMO Evonik) | 22 grams |

Sample F was prepared using the same procedure as Sample E.

The final composition is a single silane modified polymer based on only low molecular weight polyether polyol and having a viscosity of about 26000 cps; a Mn of 12645; a Mw of 23872; and a polydispersity Mw/Mn of 1.9. The final composition is stored in a moisture-proof vessel to prevent moisture induced crosslinking.

Example 11

60% weight percent of sample E and 40% weight percent of sample F were physically mixed. The final mixture had a viscosity of 44680 cps; and average Mn of 12645; an average Mw of 23872 and a polydispersity Mw/Mn of 1.9. This mixture is comparative Sample G.

Multiple one component moisture curable compositions were prepared as shown in the following table.

| Sample | Prepolymer | Crosslinker1 | Crosslinker2 | Catalyst[1] |
|---|---|---|---|---|
| 22 | Sample 5 - 50 g | C3 - 0 g | C5 - 2 g | 0.16 g |
| 23 | Sample 5 - 45 g | C3 - 5 g | C5 - 2 g | 0.16 g |
| 24 | Sample 5 - 40 g | C3 - 10 g | C5 - 2 g | 0.16 g |
| 25 | Sample 5 - 35 g | C3 - 15 g | C5 - 2 g | 0.16 g |
| H | Sample E - 50 g | C3 - 0 g | C5 - 2 g | 0.16 g |
| I | Sample E - 45 g | C3 - 5 g | C5 - 2 g | 0.16 g |
| J | Sample E - 40 g | C3 - 10 g | C5 - 2 g | 0.16 g |
| K | Sample E - 35 g | C3 - 15 g | C5 - 2 g | 0.16 g |
| L | Sample F - 50 g | C3 - 0 g | C5 - 2 g | 0.16 g |
| M | Sample F - 45 g | C3 - 5 g | C5 - 2 g | 0.16 g |
| N | Sample F - 40 g | C3 - 10 g | C5 - 2 g | 0.16 g |
| O | Sample F - 35 g | C3 - 15 g | C5 - 2 g | 0.16 g |
| P | Sample G - 50 g | C3 - 0 g | C5 - 2 g | 0.16 g |
| Q | Sample G - 45 g | C3 - 5 g | C5 - 2 g | 0.16 g |
| R | Sample G - 40 g | C3 - 10 g | C5 - 2 g | 0.16 g |
| S | Sample G - 35 g | C3 - 15 g | C5 - 2 g | 0.16 g |

C3 Silikophen AC900
C5 Geniosil GF96
[1]Dioctyl tin laurate (DOTL)

The components were weighed into a mixer and mixed for a few minutes until homogeneous.

The above prepared moisture curable compositions were cured and tested for physical properties. The results are shown in the following table.

| Sample | Prepolymer | Crosslinker1 | prepolymer viscosity (Pas) | Maximum strength (Psi) | Elongation @ max stress (%) |
|---|---|---|---|---|---|
| 22 | Sample 5 - 50 g | C3 - 0 g | 37 | 270 | 75% |
| 23 | Sample 5 - 45 g | C3 - 5 g | 37 | 382 | 73.4% |
| 24 | Sample 5 - 40 g | C3 - 10 g | 37 | 788 | 86% |
| 25 | Sample 5 - 35 g | C3 - 15 g | 37 | 1090 | 70% |
| H | Sample E - 50 g | C3 - 0 g | 71 | 150 | 110% |
| I | Sample E - 45 g | C3 - 5 g | 71 | 178 | 118% |
| J | Sample E - 40 g | C3 - 10 g | 71 | 232 | 119% |
| K | Sample E - 35 g | C3 - 15 g | 71 | 470 | 164% |
| L | Sample F - 50 g | C3 - 0 g | 26 | 170 | 40% |
| M | Sample F - 45 g | C3 - 5 g | 26 | 292 | 52% |
| N | Sample F - 40 g | C3 - 10 g | 26 | 707 | 32% |
| O | Sample F - 35 g | C3 - 15 g | 26 | 1131 | 20% |
| P | Sample G - 50 g | C3 - 0 g | 45 | 234 | 88% |
| Q | Sample G - 45 g | C3 - 5 g | 45 | 198 | 46% |
| R | Sample G - 40 g | C3 - 10 g | 45 | 743 | 70% |
| S | Sample G - 35 g | C3 - 15 g | 45 | 908 | 77% |

Comparative compositions H-K made using only high molecular weight polyether polyol were the most flexible products, although strength was lower than the other compositions. Prepolymer viscosity was higher than desired for ease of application.

Comparative compositions L-O made using only low molecular weight polyether polyol were the most rigid products with unacceptable elongation. Strength was not appreciably better than compositions 22-25. Prepolymer viscosity was acceptably low.

Comparative compositions P-S have a good balance of strength and flexibility. Viscosity of the prepolymer mixture was high.

Compositions 22-25 have the highest strengths, the best overall flexibility and good prepolymer viscosity for ease of application.

Example 12

Curable compositions were prepared using the prepolymers and crosslinker 2 shown in the below table as well as 16.2 grams Omya 520 filler available from Omya International AG; 0.5 grams Geniosil GF91 crosslinker 1, 0.5 grams Geniosil GF80 adhesion promoter available from Wacker Chemie, 0.05 grams Dibutyl tin dilaurate catalyst and 0.26 grams Dynasylan VTMO moisture scavenger. The components were combined and mixed for a few minutes until homogeneous.

Lap shear specimens were prepared and tested as follows. Substrate: 2.54 cm×7.62 cm Douglas fir wood. A 2.54 cm×2.032 cm bond area was marked. 0.3 grams of adhesive was applied to one side of one substrate in the marked bond area. A second substrate was placed over the applied adhesive and the two substrates were pressed together by hand for 30 seconds. The specimens were cured by exposure to 23° C. and 50% humidity for 24 hours. The cured specimen was tested for lap shear strength using Tenuis Olsen K50 KT. Load cell is 10,000 N/mm$^2$. Test speed is 0.2 inch per minute. Results of lap shear testing are shown in the following table.

| Sample | prepolymer (grams) | Silikophen AC900 crosslinker 2 (grams) | Lap shear (Psi) |
|---|---|---|---|
| 26 | Sample 5 - 7.5 g | 0 | 678 |
| 27 | Sample 5 - 6.2 g | 1.3 | 737 |
| T | Sample E - 7.5 g | 0 | 401 |
| U | Sample E - 6.2 g | 1.3 | 516 |
| V | Sample F - 7.5 g | 0 | 533 |
| W | Sample F - 6.2 g | 1.3 | 671 |
| X | Sample G - 7.5 g | 0 | 651 |
| Y | Sample G - 6.2 g | 1.3 | 693 |

The compositions made using disclosed prepolymer 5, comprising a mixture of a first silane modified copolymer, a second silane modified polymer and a third silane modified polymer, has good lap shear strength.

Example 13

Curable compositions were prepared using the prepolymers and crosslinker 2 shown in the below table as well as 16.2 grams Novacite 200 filler available from Malvern Minerals Co.; 0.5 grams Geniosil GF91 crosslinker 1, 0.5 grams Geniosil GF80 adhesion promoter, 0.05 grams Dibutyl tin dilaurate catalyst and 0.26 grams Dynasylan VTMO moisture scavenger. The components were combined and mixed for a few minutes until homogeneous.

Lap shear specimens were prepared and tested as disclosed above. Results are shown in the following table.

| Sample | prepolymer (grams) | crosslinker2[1] (g) | Lap shear (Psi) |
|---|---|---|---|
| 28 | Sample 5 - 7.5 g | 0 | 1017 |
| 29 | Sample 5 - 6.2 g | 1.3 | 1255 |
| Z | Sample E - 7.5 g | 0 | 754 |
| AA | Sample E - 6.2 g | 1.3 | 866 |
| AB | Sample F - 7.5 g | 0 | 727 |
| AC | Sample F - 6.2 g | 1.3 | 756 |
| AD | Sample G - 7.5 g | 0 | 855 |
| AE | Sample G - 6.2 g | 1.3 | 998 |

[1]Silikophen AC900

The compositions made using disclosed prepolymer 5, comprising a mixture of a first silane modified copolymer, a second silane modified polymer and a third silane modified polymer, had a surprisingly higher lap shear strength than the other compositions.

Example 14

A composition comprising a mixture of silane modified copolymers and polymers was prepared from the following components. This is Sample 30.

| | |
|---|---|
| Polypropylene ether polyol Acclaim ® 12200 (Covestro LLC) | 811 grams |
| Polypropylene ether polyol Arcol ® PPG 1000 (Covestro LLC) | 332 grams |
| Dioctyltin dilaurate (DOTL) (Reaxis ® C216) | 0.24 grams |
| Isophorone diisocyanate (IPDI) (Covestro LLC Desmodur I) | 161.4 grams |
| N-3-thmethoxysilyl-propyl-butylamine (Onichem A301B-Onichem) | 165.4 grams |
| Vinyltrimethoxysilane (Dynasylan VTMO Evonik) | 30 grams |

Sample 30 uses polyols at a ratio of 70% high molecular weight polyether polyol (ACCCLAIM 12200) to 30% low molecular weight polyether polyol (ARCOL PPG 1000). The isocyanate to polyol mole ratio was 1.8 to 1.

Sample 30 was prepared as follows. Charge polyols into a flask and heat to 90° C. under stirring. Apply vacuum at 90° C. for 1 hour at vacuum of 10-30 mbar. Stop vacuum and apply nitrogen to blanket the mix. Water content is 173 ppm after drying as measured by C30 Coulometric Karl Fischer titrator. Cool reactor to 70° C. Add DOTL catalyst under agitation and a nitrogen atmosphere and hold for 10 minutes at 70° C. Slowly charge IPDI into the reactor keeping temperature below 82° C. After 90 minutes, draw a sample from the reactor and measure NCO % and viscosity. Viscosity is 28650 cps at 23° C., gap=0.5 mm using Malvern Kinexus. NCO % is 2.025% measured by Mettler Toledo T50 titrator. After 110 minutes, draw a sample from reactor and measure NCO % and viscosity. Viscosity is 28750 cps at 23° C., NCO % is 2.208%. Slowly add Dynasylan1189 keeping temperature below 85° C. Add VTMO. Hold reaction for 20 minutes. Viscosity is 37800 cps; NCO % is −0.225% showing there is no isocyanate residual left.

The final composition is a mixture of a first silane modified copolymer, a second silane modified polymer and a third silane modified polymer composition having a viscosity of about 42600; an average Mn of 6810; and average Mw of 16,328; and a polydispersity Mw/Mn of 2.4. The final composition is stored in a moisture-proof vessel to prevent moisture induced crosslinking.

Example 15

A comparative composition comprising a single silane modified polymer based on only low molecular weight polyether polyol was prepared from the following components. This is Sample AF.

| | |
|---|---|
| Arcol ® PPG 1000 (Covestro LLC) | 700 grams |
| Dioctyltin dilaurate (DOTL) (Reaxis ® C216) | 0.3 grams |
| Isophorone diisocyanate (IPDI) (Covestro LLC Desmodur I) | 249 grams |
| N-3-trimethoxysilyl-propyl-butylamine (Dynrasylan1189 Evonik) | 211 grams |
| Vinyltrimethoxysilane (Dynasylan VTMO Evonik) | 34 grams |

Sample AF was prepared using the same procedure as Sample E.

The final composition is a single silane modified polymer based on only low molecular weight polyether polyol and having a viscosity of about 53700 cps; a Mn of 4277; a Mw of 6208; and a polydispersity Mw/Mn of 1.45. The final composition is stored in a moisture-proof vessel to prevent moisture induced crosslinking.

Example 16

70% weight percent of sample E and 30% sample AF were physically mixed to prepare a physical mixture of higher molecular weight silane-terminated polyurethane polymer and low molecular weight silane-terminated polyurethane polymer. The final mixture had a viscosity of 66840 cps; an average $M_n$ of 9529; an average $M_w$ of 23977 and a polydispersity $M_w/M_n$ of 2.5. This mixture is comparative sample AG.

Curable compositions were prepared using the prepolymers and crosslinker 2 shown in the below table as well as 2 grams Geniosil GF 96 and 0.16 grams dioctyl tin dilaurate catalyst. The components were combined and mixed for a few minutes until homogeneous.

| Sample | Pre-polymer (g) | crosslinker[1] (g) | Maximum tensile strength (Psi) | Elongation @ max stress (%) |
|---|---|---|---|---|
| 31 | Sample 30 - 50 | 0 | 388 | 98 |
| 32 | Sample 30 - 45 | 5 | 604 | 95 |
| 33 | Sample 30 - 40 | 10 | 952 | 83 |
| 34 | Sample 30 - 35 | 15 | 1504 | 80 |
| AH | Sample E - 50 | 0 | 150 | 110 |
| AI | Sample E - 45 | 5 | 178 | 118 |
| AJ | Sample E - 40 | 10 | 232 | 119 |
| AK | Sample E - 35 | 15 | 470 | 164 |
| AL | Sample AF - 50 | 0 | 237 | 31 |
| AM | Sample AF - 45 | 5 | 302 | 38 |
| AN | Sample AF - 40 | 10 | 433 | 37 |
| AO | Sample AF - 35 | 15 | 744 | 62 |
| AP | Sample AG - 50 | 0 | 265 | 94 |
| AQ | Sample AG - 45 | 5 | 555 | 88 |
| AR | Sample AG - 40 | 10 | 894 | 95 |
| AS | Sample AG - 35 | 15 | 1289 | 88 |

[1]Silikophen AC900

Sample 30 comprising a mixture of a first silane modified copolymer, a second silane modified polymer and a third silane modified polymer composition has a surprisingly higher strength and very good flexibility compared to all of the comparative samples.

Example 17

Curable compositions were prepared using the prepolymers and crosslinker 2 shown in the below table as well as 16.2 grams Omya 520 filler; 0.5 grams Geniosil GF91 crosslinker 1, 0.5 grams Geniosil GF80 adhesion promoter, 0.05 grams Dibutyl tin dilaurate catalyst and 0.25 grams Dynasylan VTMO moisture scavenger. The components were combined and mixed for a few minutes until homogeneous.
Lap shear specimens were prepared and tested as follows. Results are shown in the following table.

| Sample | prepolymer | crosslinker2[1] (g) | Lap shear (Psi) |
|---|---|---|---|
| 35 | Sample 30 - 7.5 g | 0 | 728 |
| 36 | Sample 30 - 6.2 g | 1.3 g | 750 |
| AT | Sample E - 7.5 g | 0 | 401 |
| AU | Sample E - 6.2 g | 1.3 g | 516 |
| AV | Sample AF - 7.5 g | 0 | 710 |
| AW | Sample AF - 6.2 g | 1.3 g | 727 |
| AX | Sample AG - 7.5 g | 0 | 681 |
| AY | Sample AG - 6.2 g | 1.3 g | 645 |

[1]Silikophen AC900

Samples 35 and 36 comprising a mixture of a first silane modified copolymer, a second silane modified polymer and a third silane modified polymer composition has a surprisingly good lap shear strength. Samples AT and AU comprising only the high molecular weight polyol had the lowest lap shear strength. Samples AV and AW also showed good share strength. However, this polymer consumed the large amount of isocyanate and aminosilane. Samples AX and AY comprising the physical blend of 70% Sample E and 30% Sample AF had a lap shear strength lower than Samples 35 and 36.

Example 18

Curable compositions were prepared using the prepolymers and crosslinker 2 shown in the below table as well as 16.2 grams Novacite 200 filler; 0.5 grams Geniosil GF91 crosslinker 1, 0.5 grams Geniosil GF80 adhesion promoter, 0.05 grams dibutyl tin dilaurate catalyst and 0.25 grams Dynasylan VTMO moisture scavenger. The components were combined and mixed for a few minutes until homogeneous. Lap shear testing was done as described above. Results are shown in the following table.

| Sample | prepolymer | crosslinker2[1] (g) | Lap shear (Psi) |
|---|---|---|---|
| 37 | Sample 30 - 7.5 g | 0 | 1135 |
| 38 | Sample 30 - 6.2 g | 1.3 g | 1309 |
| AZ | Sample E - 7.5 g | 0 | 754 |
| BA | Sample E - 6.2 g | 1.3 g | 866 |
| BB | Sample AF - 7.5 g | 0 | 1033 |
| BC | Sample AF - 6.2 g | 1.3 g | 1075 |
| BD | Sample AG - 7.5 g | 0 | 1000 |
| BE | Sample AG - 6.2 g | 1.3 g | 1214 |

[1]Silikophen AC900

The lap shear strength of example 7 made with the mixture of the 70% polyol Acclaim 12200 and 30% Arcol PPG 1000 showed the highest lap strength.
Samples 37 and 38 comprising a mixture of a first silane modified copolymer, a second silane modified polymer and a third silane modified polymer composition has a surprisingly good lap shear strength. Samples AZ and BA comprising only the high molecular weight polyol had the lowest lap shear strength. Samples BB and BC also showed good share strength. Samples BD and BE comprising the physical blend of 70% Sample E and 30% Sample AF had a lap shear strength lower than Samples 37 and 38.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

We claim:
1. A moisture curable composition, comprising:
    a first, crosslinkable copolymer having a plurality of silyl alkoxy terminal groups and a backbone that is the reaction product of a diisocyanate and a mixture of polyols, the mixture of polyols comprising a low molecular weight polypropylene diol having a molecular weight in the range of 1000-2,000 Mn and a high molecular weight polypropylene diol having a molecular weight in the range of 8,000-16,000 Mn;
    a second crosslinkable oligomer having a plurality of silyl alkoxy terminal groups and a backbone that is the reaction product of a diisocyanate and a low molecular weight polypropylene diol having a molecular weight in the range of 1,000-2,000 Mn;
    a third crosslinkable oligomer having a plurality of silyl alkoxy terminal groups and a backbone that is the reaction product of a diisocyanate and a high molecular weight polypropylene diol having a molecular weight in the range of 8,000-16,000 Mn.

2. The moisture curable composition of claim 1, being essentially free of solvent.

3. The moisture curable composition of claim 1, being essentially free of monomeric isocyanate.

4. The moisture curable composition of claim 1, being essentially free of compounds having isocyanate functionality.

5. The moisture curable composition of claim 1, further comprising about 1 wt. % to about 30 wt. % by weight of the moisture curable composition of a crosslinker having a molecular weight below 400 g/mole and comprising a silicon atom bonded to at least one alkoxy group.

6. The moisture curable composition of claim 1, further comprising about 1 wt. % to about 30 wt. % by weight of the moisture curable composition of a crosslinker having a molecular weight below 200 g/mole and comprising a silicon atom bonded to at least two alkoxy groups.

7. The moisture curable composition of claim 1, further comprising about 1 wt. % to about 30 wt. % by weight of the moisture curable composition of a siloxane oligomer having pendant aryl groups and at least one alkoxy group.

8. The moisture curable composition of claim 1, comprising about 6 wt. % to about 40 wt.% of the first, crosslinkable copolymer; about 1 wt. % to about 10 wt. % of the second crosslinkable oligomer and about 1 wt. % to about 15 wt. % of the third crosslinkable oligomer, based on weight of the moisture curable composition.

9. The moisture curable composition of claim 1, wherein the diisocyanates are all aliphatic, monomeric diisocyanates.

10. The moisture curable composition of claim 1, wherein the diisocyanates are selected from the group consisting of IPDI, MDI or TDI.

11. The moisture curable composition of claim 1, wherein the first, crosslinkable copolymer has a backbone comprised of blocks of the low molecular weight polypropylene diol and the high molecular weight polypropylene diol separated by a diisocyanate residue.

12. The moisture curable composition of claim 1, wherein the first, crosslinkable copolymer has a backbone comprised of blocks of the low molecular weight polypropylene diol and the high molecular weight polypropylene diol separated by an aliphatic diisocyanate residue.

13. The moisture curable composition of claim 1, further comprising about 70 wt. % to about 85 wt. % by weight of the moisture curable composition of additives.

14. The moisture curable composition of claim 1 wherein the low molecular weight polypropylene diol comprises a polypropylene ether diol and the high molecular weight polypropylene diol comprises a linear polypropylene ether diol.

15. The moisture curable composition of claim 1 wherein the low molecular weight polypropylene diol comprises a polypropylene glycol and the high molecular weight polypropylene diol comprises a linear polypropylene ether diol.

16. A cured reaction product of the moisture curable composition of claim 1.

17. A moisture curable adhesive or sealant comprising the moisture curable composition of claim 1.

18. A moisture curable adhesive or sealant comprising the moisture curable composition of claim 1 and at least one filler and at least one moisture scavenger.

19. A moisture curable adhesive or sealant comprising the moisture curable composition of claim 1 and at least one of crosslinker, filler, moisture scavenger, plasticizer, reactive diluent, adhesion promoter, catalyst, UV stabilizer and colorant.

\* \* \* \* \*